Patented Aug. 18, 1936

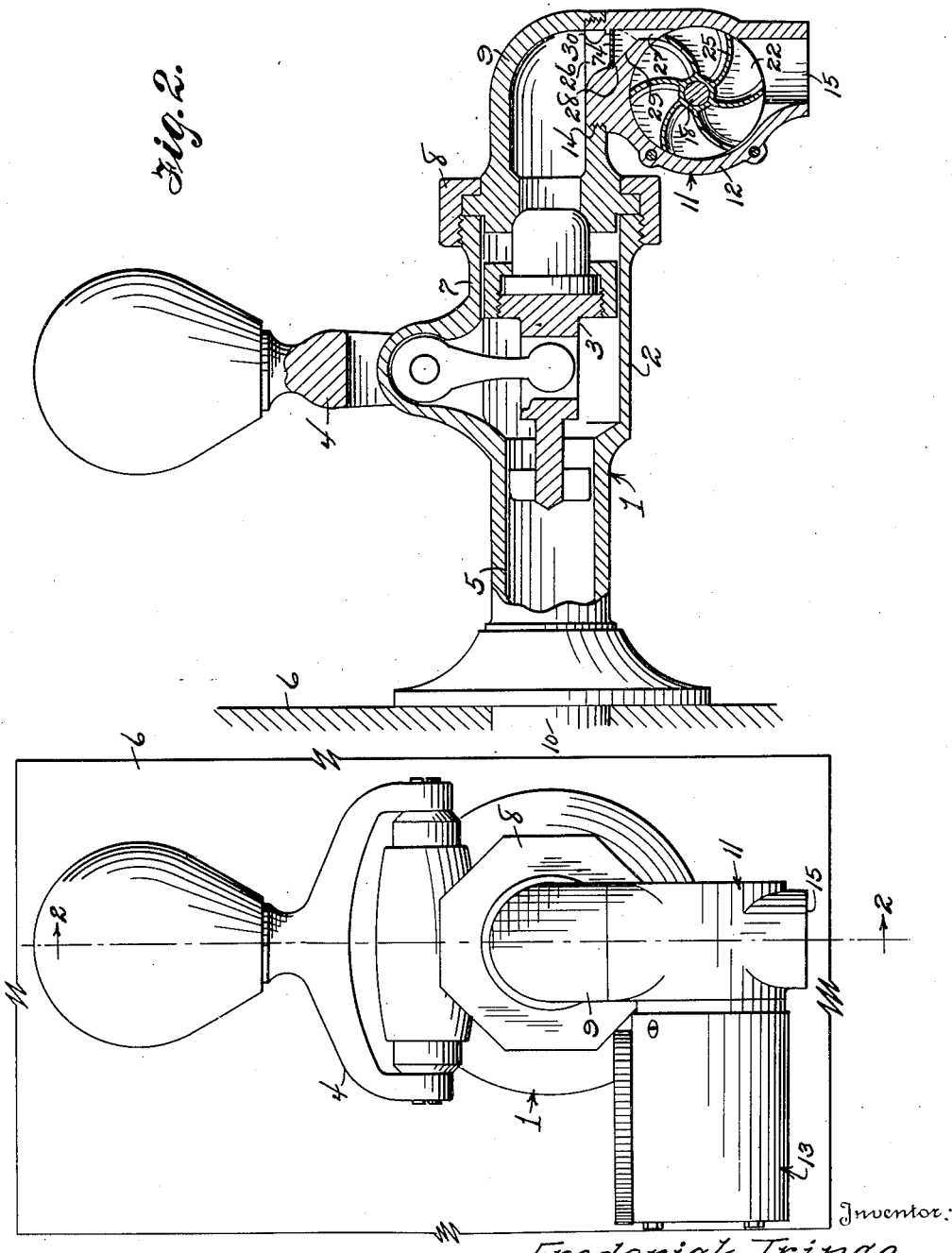

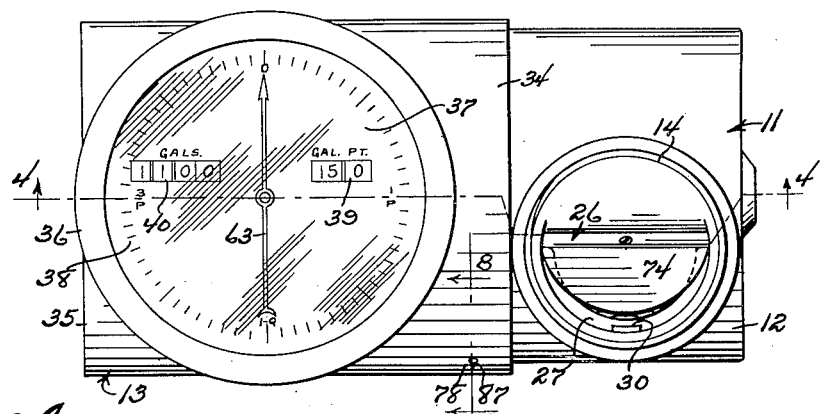
Fig.3.
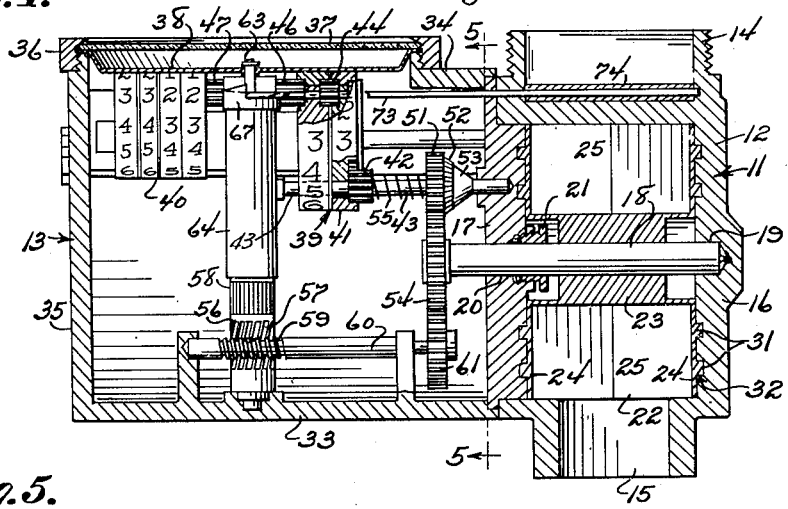
Fig.4.
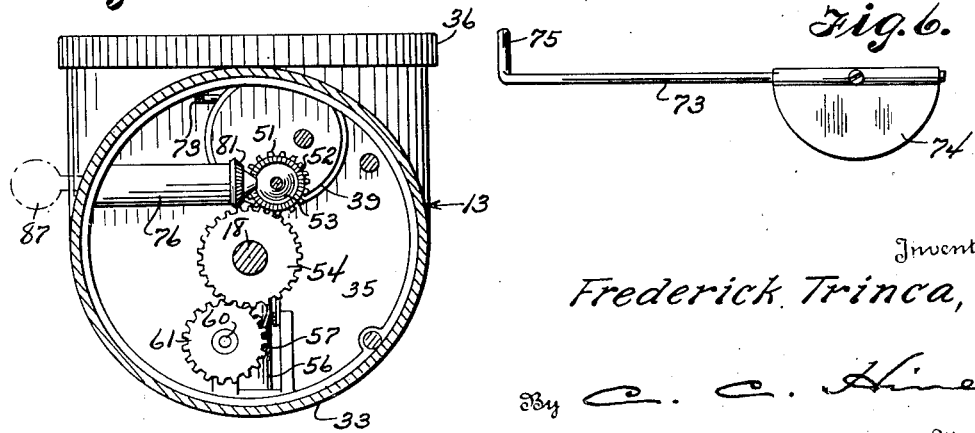
Fig.5.
Fig.6.
Inventor:
Frederick Trinca,
By C. C. Hiner,
Attorney.

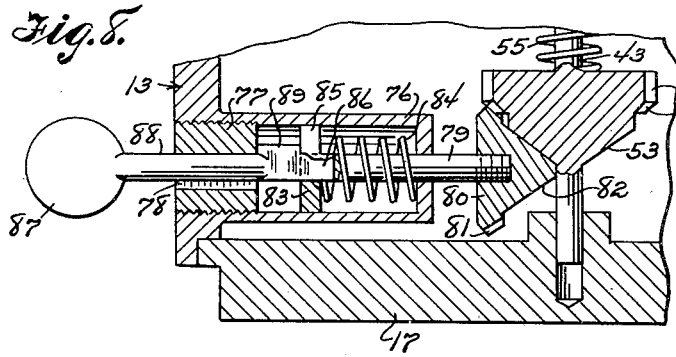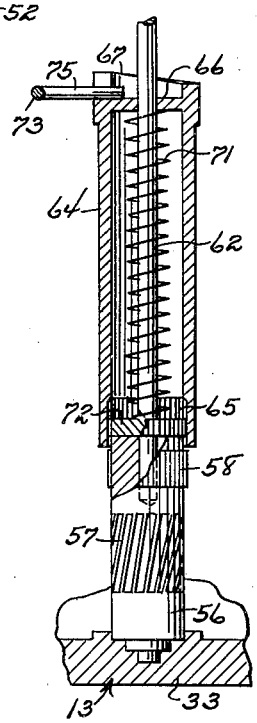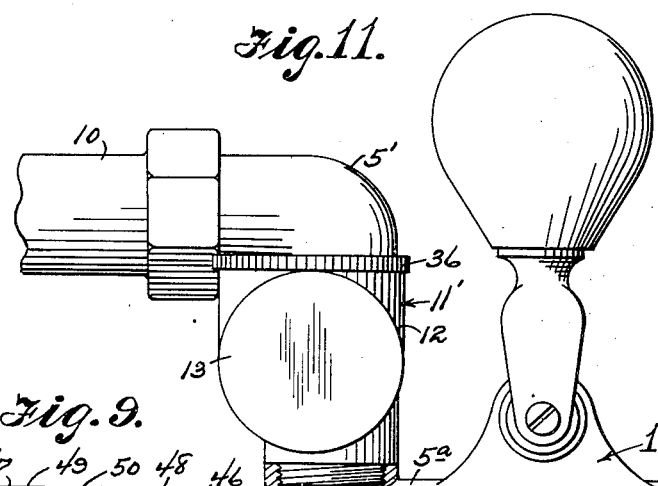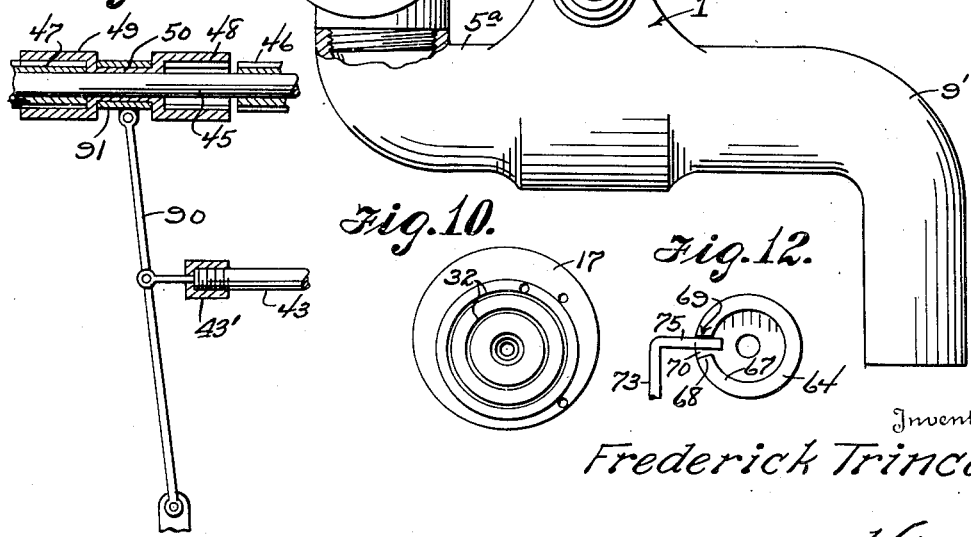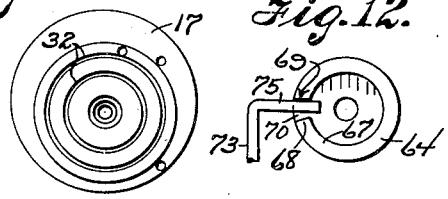

2,051,429

UNITED STATES PATENT OFFICE 2,051,429

BEER METERING DEVICE

Frederick Trinca, Long Island, N. Y.

Application September 16, 1933, Serial No. 689,774

4 Claims. (Cl. 73—229)

This invention relates to a device or faucet for dispensing beer and other similar beverages or liquids in general which are sold by the glass or in variable quantities, and particularly to means for indicating and registering the amount of liquid dispensed from a liquid containing receptacle and the total or aggregate amount dispensed from a plurality of successive receptacles within any given time.

In dispensing beer or other similar beverages or liquids which are sold over a counter or otherwise in variable quantities by the glass of a certain capacity, or by the pint, quart, half gallon or other measured quantity, it is desirable that a record may be kept of the amount dispensed from a keg or other container in use at the time, or from a series of such containers within a given period, in order that losses due to waste or other causes may be deterred or prevented.

One object of my invention is to provide a faucet or dispensing device embodying simple, reliable and efficient means for indicating in connection with each transaction the amount of liquid dispensed, for registering and indicating the amount of liquid dispensed from a container in use at the time, and for also registering and indicating, if desired, the total or aggregate amount dispensed from a plurality of successive containers within a given period of time.

A further object of the invention is to provide indicating and registering means for use upon a dispensing faucet which is normally inoperative for use and which is rendered operative by the flow of the liquid through the faucet, whereby casual shifting of the parts between operating periods, with obviously objectionable results, will be prevented.

A still further object of the invention is to provide an indicating and registering attachment or unit which may be applied to an ordinary type dispensing faucet, either preceding or following the valve member thereof, with little or no alteration in the faucet construction.

With the foregoing and other objects in view, which will appear in the course of the subjoined description, the invention consists of the novel features of construction, combination and arrangement of parts, hereinafter fully described and claimed and shown in the accompanying drawings, in which:—

Fig. 1 is a front end elevation of a measuring faucet provided with an indicating and registering unit constructed in accordance with my invention.

Fig. 2 is a vertical longitudinal section of the same.

Fig. 3 is a top plan view of the measuring and registering unit removed from the faucet.

Fig. 4 is a section on line 4—4 of Fig. 3.

Fig. 5 is a section on line 5—5 of Fig. 4.

Fig. 6 is a view of the pressure actuated control member.

Fig. 7 is a sectional view through the transmission clutch and gear unit controlled thereby.

Fig. 8 is an enlarged sectional view on line 8—8 of Fig. 3, showing particularly the resetting device.

Fig. 9 is a detail section of the transmission gearing and clutch, controlled by the control member, for actuating the indicators of the measuring and registering unit.

Fig. 10 is a view of the removable head of the impeller casing.

Fig. 11 is a side elevation of a faucet in which the measuring unit is arranged in the intake branch thereof.

Fig. 12 is a plan view of the shifter sleeve showing the cam.

Referring now more particularly to the drawings, I designates a beer or other beverage or liquid dispensing faucet of a known type comprising a horizontally disposed casing 2 in which is arranged a sliding valve member 3 movable by an operating handle 4 for controlling the flow of liquid through the faucet casing. The casing is provided with an intake branch 5 suitably mounted in practice upon a counter or dispensing cabinet 6 and with a discharge branch 7 threaded to receive a coupling ring 8 connecting thereto a detachable discharge nozzle 9. In this particular instance the seat for the valve member 3 is formed in the nozzle 9, and this nozzle 9 is made detachable so that the nozzle and measuring unit may be applied in such manner as to permit of their ready connection and disconnection for convenience in cleaning or repairing the parts or substituting new parts for old and worn out ones as required from time to time in the service operation of the apparatus. If desired, however, the nozzle 9 may be made integral with the outlet 7 and suitably constructed for the application of the measuring unit thereto. The intake branch 5 of the faucet casing is suitably connected in practice with a liquid supply pipe 10 leading to a cooling coil in the cabinet 6 or otherwise to a beer cask or other container containing the liquid which is to be dispensed in measured quantities under a suitable forcing pressure.

In accordance with my invention, I provide a liquid measuring and counting or registering mechanism for indicating the amount of liquid which has been dispensed for indicating current sales or the amount of liquid dispensed from a keg or container which supplies the faucet at any particular time, and for also indicating and registering the total sales or aggregate amount of liquid dispensed, for example, from a plurality of containers with which the faucet is successively connected, during any given period of time, that is, at the end of every week, every half month or every month, as desired, so that a check upon the amount dispensed from a container in use and an estimate of the amount remaining therein to be dispensed may be obtained at any time, as well as the total dispensed during any desired period of time. This liquid measuring and counting or registering mechanism is of unitary construction and, as shown in Figs. 1 to 10, inclusive, is applied to the discharge nozzle 9 of the faucet, but, as hereinafter described, and as shown in Fig. 11, the unit may be applied in the intake branch of the faucet between the valve 3 and the supply pipe 10.

The said liquid measuring and counting or registering unit comprises a housing 11 which conveniently consists of a meter or measuring casing or chamber 12 and a gear casing or chamber 13. The casing or chamber 12 is provided at its top with an externally threaded inlet connection 14 and at its bottom with an outlet or discharge connection 15, and said chamber is closed at one side by a fixed wall 16 and is normally open at its opposite side or that side facing the adjacent side of the chamber or casing 13. This normally open side of the chamber or casing 12 is closed by a detachable wall or head 17. Disposed within this casing is a drive shaft 18 which is mounted at one end in a bearing socket 19 in the wall 16 and extends at its opposite end externally through an opening 20 in the wall or head 17 and is journaled in a bearing 21 fitted and secured within the inner portion of said opening 20. Fixed to this shaft is a rotary measuring wheel 22 which comprises in its construction a central hub 23 fixed to the shaft 18, a pair of end heads or disks 24, and an annular series of spiral propeller blades 25 fixed to the hub and disks and extending outwardly from the hub to the peripheries of the disks.

The inlet connection 14 of the measuring casing or chamber 12 which is threaded, as stated, in the outlet end of the faucet 9, is provided with an intake passage located mainly or wholly on one side of its vertical center and having a widened intake portion 26, a constricted delivery portion 27 communicating tangentially with the meter wheel receiving portion of the casing and with the pockets between the blades of the wheel, and a flaring or tapering intermediate portion 28 at the inner side of which is an inclined supporting ledge or shoulder 29 and at the top and outer side of which is a stop shoulder 30. When the valve 3 of the faucet is open the fluid discharging under pressure therethrough enters the outlet or discharge branch 9 and then flows through the portions of the passages 26, 27 and 28 to the measuring wheel chamber in such manner as to enter into one of the pockets of the measuring wheel at one side of the vertical center and below the horizontal center of the wheel so as to always positively effect the rotation of the wheel in one, namely a clockwise, direction. The arrangement and formation of this passage also ensures a concentration of the force of the liquid under pressure on the blades of the wheel which, supplemented by the force of gravity or head on the liquid, will always ensure a positive movement of the wheel even in the event of the liquid being discharged under a low forcing pressure. The liquid passing through the measuring chamber is discharged through the outlet 15 at the bottom of the casing 12 and in its passage a definite amount is discharged on each rotation of the wheel. As shown, the disks 24 of the measuring wheel are provided with annular series of packing ribs 31 which engage recesses 32 in the inner faces of the walls 16 and 17 to prevent leakage of liquid between said disks and walls and to ensure that all the liquid will pass into the pockets of the measuring wheel.

The gear casing or chamber 13 comprises a body having a bottom wall 33, a top wall 34 and a side wall 35, the opposite side of the casing being normally open and closed in the assembled condition of the parts by the head or wall 17 of the casing 12, the parts being united by suitable fastenings so that the casings 12 and 13 may be disconnected to permit access to the interiors thereof for application, removal, cleaning or repairs of the contained working parts. The top wall 34 of the casing 13 is provided with a circular portion engaged by a threaded clamping ring 36 which confines in position an observation panel 37 of glass or other transparent material and a dial 38 having openings therein through which numerals upon the rotary indicating disks or wheels of primary and secondary registers, indicating devices or measurers 39 and 40, respectively, are exposed.

The disks or wheels of the register 39 may vary in number as desired or required, but in the present instance consist of two disks, namely a units and a tens disk, bearing numerals representing measured quantities of liquid dispensed, such quantities in the present instance comprising pints and gallons, as indicated upon the dial in connection with the associated dial openings, while the wheels or disks of the register 40, which may also vary in number as desired or required, consist in the present instance of four such wheels or disks representing units, tens, hundreds and thousands, designating the number of gallons dispensed, as indicated by the appropriately designated associated opening in the dial. The disks of each register may be indicator disks of ordinary type loosely mounted for rotation on supporting shafts and provided with gear portions or rings and transfer elements or gears meshing with the rings for properly rotating the same and transferring motion from one ring to the other. I have not deemed it necessary to fully and completely show the transfer elements in detail, as the construction and operation of counter wheels or disks of registers of this type are well known. For the purpose of making a sufficient disclosure of this invention the first or units disk of the register 39 is shown as provided with a gear ring 41 receiving motion from a drive pinion 42 splined on a primary transmission shaft 43, and whereby said units disk or ring is driven. This disk or ring rotates through sixteen indicating steps, representing pints, every half turn of the disk representing one gallon, and then at every half turn the disk transfers motion through a transmission gear 44 to the second or tens disk of said register, which rotates through a certain number of gallons indicating steps, from one to fifteen or more, and which may have a maximum registering capacity corresponding, if desired, to that of a conventional beer or other liquid containing cask or barrel from which a certain liquid to be dispensed is customarily dispensed. The first disk or wheel of the register 40 is designed to be rotated from the tens disk of the register 39 by suitable intervening transmission mechanism and to communicate motion to the succeeding disk of the register 40 by means of transfer elements of the usual or any suitable type for properly communicating motion from one to the other so as to indicate through the appropriate slot in the dial the total amount of liquid which has been dispensed within a given period of time. As shown in the present instance, the transmission mechanism for transferring motion from the tens disk of register 39 to the units disk of register 40 comprises a shaft 45 on which the gear 44 is loosely mounted and on which are also loosely mounted a pair of transmission gears 46 and 47 meshing respectively with toothed rings on the tens disk of register 39 and units disk of register 40. These gears 46 and 47 are normally coupled for rotation in unison by hollow clutch gears 48 and 49, respectively, on a sleeve 50 slidable and rotatable on the shaft 45, the sleeve 49 being constantly in engagement with the gear 47 while the sleeve 48 is movable into and out of engagement with the gear 46 for the purpose of disengaging the register disk 40 from the register disk 39 whenever it is desired to reset the register 39, as hereinafter described.

The shaft 43 carries a spur gear 51 having a beveled gear portion 52 and a cone-shaped portion 53, and said gear 51 meshes with and receives driving motion from a drive gear 54 on the drive shaft 18 operated by the measuring or impeller wheel 22. The shaft 43 is rotatably and slidably mounted so that it may be slidably moved to shift the gear 51 out of driving mesh with the gear 54, and a spring 55 is provided to normally hold said shaft 43 shifted in one direction so as to normally keep the gear 51 in engagement with the driving gear 54.

Journaled for rotation in the bottom of the casing 13 is a gear element 56 in the form of a rotatable shaft provided with a worm gear portion 57 and a spur gear portion 58, said worm gear portion 57 meshing with a worm 59 on a transmission shaft 60 driven by a gear 61 from the drive gear 54 on shaft 18, whereby the gear element 56 is driven. The upper end of gear element 56 is provided with a socket forming a bearing for the lower end of a shaft or spindle 62 disposed coaxially with said gear element shaft 56 and carrying at its upper end a hand or pointer 63 which traverses the face of the dial 38. The portion of the shaft or spindle 62 within the casing 13 and the upper end of the shaft 56 are enclosed by a slidable and rotatable control or clutch sleeve 64 having at its lower end internal gear teeth 65 and at its upper end an apertured guide head 66 slidably engaging the shaft 62 and surmounted by a cam member 67 of nearly circular form, said cam member having a depressed end portion 68 and a recessed end portion 69 with an inclined cam surface therebetween, and said end portions 68 and 69 being separated sufficiently to provide a starting gap or notch 70 and a stop shoulder at the side of the notch formed by the high end of the cam. The sleeve 64 is normally held elevated by means of a coiled spring 71 enclosed therein between the head 66 and a spur gear member 72 fixed to the lower end of said shaft 62, and which gear is normally engaged by the teeth 65 of the sleeve 64, which are held above and out of mesh with the gear member 58, whereby the lower end of the sleeve is guided and said sleeve normally coupled to the shaft 62 for rotation therewith while being operatively disconnected from the shaft 54 by reason of the gear portion 65 being lifted out of engagement with the gear portion 58.

The gearing comprising the elements 56, 57, 58, 59, 60, 61 and 65 which drive the indicator hand 63 is, therefore, normally maintained out of action until the sleeve 64 is depressed to bring gear surface 65 into engagement with gear surface 58, so as to effect a transmission of motion from shaft 56 to shaft 62, so that normally no indicating motion of the indicator hand 63 can occur. In order to effect a shifting of the clutch sleeve 64 to connect said sleeve and the shaft 62 to the shaft 56 for actuation thereby, a shifter is provided which is automatically thrown into operation when the valve 3 is open for dispensing fluid to connect the shafts 56 and 62 by means of the clutch sleeve 64 and which is automatically thrown out of operation to disconnect said shaft and sleeve when the valve is closed to cut off the discharge of the liquid. This shifter comprises a rock shaft or rod 73 which is journaled in the casings 12 and 13, one end of said rod being disposed in the inlet 14 of the casing 12 and carrying an actuating valve blade or plate 74 disposed therein, while the opposite end of said rod is bent to provide an actuating arm 75 adapted for cooperation with the cam member 67. Normally the blade or plate 74 is disposed in the full line position shown in Fig. 2 in which it is held elevated above the inclined seat 29 and in contact with the stop shoulder 30 to act as a valve or stop to close communication between the nozzle 9 and portions 27 and 28 of the feed passage in the casing 12, in which position it is held by the pressure of the spring 71 holding the sleeve 64 in upraised or retracted position, in which position the arm portion 75 of the shaft 73 lies in the cam gap or slot 70 and operates as a crank to turn the shaft 73 and blade or plate 74 to the stated position. As soon, however, as handle 4 is actuated to open valve 3, the pressure of the liquid striking the blade or plate 74 causes the latter to be forced downward to a position in which it uncovers the feed passage portion 27 and seats against the shoulder 29, thus effecting a rocking motion of the shaft 73 in which the crank arm 75 is caused to engage part 66 and to depress the sleeve 64 to bring its toothed portion 65 into engagement with the toothed portion 58 of shaft 56, whereby said sleeve and shaft will be coupled together for rotation in unison and to transfer driving motion to shaft 62 whereby the indicator hand or pointer 63 is operated. The sleeve 64 will be held in this clutching position and the hand in operation traversing the dial 38 as long as the sleeve is held depressed, or as long as the valve is open and liquid flowing. The hand 63 in making one complete revolution indicates the flow of a pint of the liquid or indicated fractions thereof. As soon, however, as the valve is closed to cut off the flow of liquid, the blade or plate 74, on being relieved from pressure will offer no resistance to the upward movement of the sleeve by the spring 71, and said sleeve will accordingly be elevated by the spring 71 to disengage the gear teeth 65 from the gear teeth 58, thus throwing shaft 56 out of gear with the shaft 64 and spindle 62, whereupon the operation of the hand or pointer 63 will be stopped. It will be understood that the purpose of the gear connection 65—72 between shaft 64 and spindle 62 is to connect said shafts in fixed relation against relative rotation, and thereby to maintain a fixed relation between the pointer 63 and starting notch 70, while at the same time allowing sliding movement of shaft 64 on spindle 62 to shift the gear teeth 65 into and out of engagement with the gear teeth 58. The purpose of providing the cam 67 is, as previously described, to form the starting gap 70 and to provide a means operating in conjunction with arm 75 to hold the elevated shaft 64 and the spindle 62 from casual rotation in either direction unless and until rotated by the shaft 56 thus ensuring an accurate resetting of said parts after a dispensing action and their maintenance in staring position until another dispensing action is begun. A further purpose of the cam 67 is to effect a sufficient extent of depression of the shaft 64 to tension the spring 71 to a sufficient degree to, at all times, return the shaft 64 to its normally elevated position, when allowed to do so by crank arm 75, and to effect a positive engagement between gears 65 and 58 during such spring tensioning action. It will be understood that on the downward movement of the plate 74 into engagement with the abutment surface 29 the rocking movement of the arm 75 on the bottom wall of gap 70 will be sufficient to depress the shaft 64 to a certain degree, enough to bring the lower end of gear into engagement with the upper end of gear 58 to start rotation of the sleeve 64 and pointer operating spindle 62 and that thereafter the arm 75 rides on the cam surface 67 to depress the shaft 64 to the full extent necessary to compress and tension the spring to the degree required, which action is permitted and compensated for, while the rotation of parts 64—62 is maintained, by the downward sliding travel of the gear teeth 65 on the teeth of gear 58. If only a pint of liquid is dispensed, as indicated by one complete rotation of the pointer about the indicator dial and the flow of liquid is then cut off the arm 75 will be immediately elevated and the spring 71 will return the parts 62—64 and the indicator hand to starting position, otherwise the indicator hand will continue to rotate about the face of the dial to indicate the amount of liquid dispensed in pints until the faucet is closed to cut off the flow of liquid. If by any chance the flow of liquid is cut off at any time when arm 75 does not rest in gap 70 spring 71 will return indicator parts to a starting position in which arm 75 is again positioned in gap 70.

It will be understood from the foregoing that in the operation of the apparatus, for dispensing beer, for example, the movement of the faucet handle 4 to open the valve 3 for a dispensing action will cause a downward movement of plate 74 and the shifting of the cam sleeve 64 to couple the hand operating shaft 56 with the drive gearing for the indicating movement of the hand 63 on the rotation of the impeller or measuring wheel. This wheel measures a definite quantity of liquid filling its pockets on each revolution or a fraction of a revolution thereof, and its motion is transmitted to the hand or pointer 63 to visually indicate each pint of liquid, or a fraction thereof dispensed, and at the same time the shaft 43 is driven for transmitting motion to the primary register 39 and therefrom in proper sequence to the secondary register 40. The units and tens indicating wheels or counters of the primary register 39 respectively indicate through the coacting slot in the dial the amount of liquid, in pints or fractions thereof, or each dispensing action, and in gallons thereof in one or more dispensing operations, up to a maximum of eight pints for the units disk, after which motion is transmitted to the tens disk, for indicating from one gallon up to any desired number of gallons which may be the maximum number of gallons held by a beer keg or barrel of a standard containing capacity or size from which the beverage is usually dispensed. By this means an accurate indication may be given of not only the amount of liquid dispensed on each dispensing action, which may be a full pint or a fraction of a pint in the case of a stein, glass, or like receptacle, but also of the number of gallons of liquid dispensed on any one or a multiplicity of dispensing operations, from which the amount dispensed from the time a filled cask is connected with the dispensing apparatus for use up to the time it is fully empty will be indicated and the amount remaining in a cask, after a certain number of gallons have been dispensed, may be determined, so that by means of the indicator hand and the primary register an accurate and complete tab of the amount of liquid dispensed or current sales made from a container in use may be gained. The secondary register 40 may be conveniently employed for registering the aggregate or total amount of liquid from a plurality of receptacles successively used which may be dispensed within a given period of time, for example, a week, half monthly, or monthly, so that a complete tab or check upon the amount of liquid dispensed during any certain period and from any certain number of receptacles will be furnished. My invention therefore provides a measuring faucet having means for indicating quantities of liquid dispensed in such manner as to enable the proprietor of an establishment to keep accurate tab upon sales made or liquid dispensed and to prevent the losses ordinarily due to careless manipulation and waste or other causes.

Means are provided whereby the primary register 39 may be operably disconnected from the secondary register 40, so that said primary register may be turned back or reset at the end of a certain checking period or at the time an empty container is being disconnected and a new container is being applied, without in any manner disturbing previous adjustments of the register 40. This means comprises, as shown particularly in Figs. 5 and 8, a sleeve or casing 76 on the head 17, which opens at one end through the head and is partly closed at that point by a threaded closure plug 77 having a slot 78 therein. In this casing is slidably and rotatably mounted a resetting shaft 79 carrying at its outer end a resetting gear 80 having beveled gear teeth 81 and a cone surface 82. At its inner end the shaft 79 is coupled to a guide disk or head 83 on which acts a spring 84 which normally moves the shaft toward the plug 77 to hold the gear 80 in retracted position. The disk or head 83 is provided with a slot 85 to receive a bead 86 upon the extremity of the shank of an operating key or tool 87, the shank portion 88 of which is of somewhat less width than the slot 78 in the plug 77 and is provided with a lateral bead 89 which is adapted when the key is inserted to lie between the plug 77 and disk 83 and to form a shoulder whereby the disk and shaft 79 may be moved forward to gear engaging position and the bead 89 then turned out of register with the slot 78 to form a locking member to hold the key against casual withdrawal under pressure of the spring 84, whereby the gear 80 may be held in projected or engaging position as long as it is desired to hold the register 39 out of action. When the shaft 79 is moved forward by the action of the key 87 its cone surface 82 engages the cone surface 53 of gear 51 and slides said gear out of engagement with the drive gear 54 without disconnecting gear 42 from the unit disk of the register 39, this movement continuing until beveled gear portion 81 of gear 80 is brought into engagement with beveled portion 52 of gear 51, whereupon by rotating the shaft 79 and gear 80 by means of the key 87, gear 52 and shaft 43 may be rotated to turn gear 42 to turn the disks of register 39 back to starting position. This sliding movement of shaft 43 transmits motion through a connection 43′ to a shifting lever 90 to which it is coupled to slide the sleeve 50 through the action of a sleeve 91 loosely mounted thereon and pivoted to lever 90, so as to move clutch gear 48 out of engagement with gear 46, thus breaking the transmission connection between the registers 39 and 40 and allowing register 39 to be turned back or reset without changing the positions of the disks of the total register 40, as will be readily understood.

In Figs. 1 and 2 of the drawings I have shown a construction in which the measuring unit is constructed for attachment to the discharge end, branch or nozzle of a dispensing faucet, in which the unit is threaded into engagement with a nozzle which is detachably connected to the outlet branch of the body of the faucet. This construction is a simple and desirable one for the reason that it permits of the ready application as well as removal of parts when desired for cleaning, repairs or other purposes. In Fig. 11 of the drawings I have shown a modification in which the outlet branch 9′ of the faucet 1′ is of L-shaped formation and in which the measuring unit 11′ is designed for application between the divided portions 5′ and 5a of an L-shaped intake branch of the faucet, or, in other words, in which the inlet and outlet ends of the meter casing of the unit are threaded or otherwise formed for detachable connection with an intake branch 5a of the faucet and an elbow unit 5′ connected with the supply pipe 10. This modified structure, as well as that shown in Figs. 1 and 2 may be used by slightly altering faucets of conventional type, and that shown in Fig. 2 may be employed in conjunction with a faucet having an intake branch like that in Figs. 1 and 2 and a discharge branch like that shown at 9′ in Fig. 11, by cutting away the depending portion of the branch 9′ and internally threading the opening in the end of the remaining portion.

From the foregoing description, taken in connection with the accompanying drawings, the construction, mode of operation and advantages of my improved measuring faucet will be readily understood by those versed in the art without a further and extended description, and it will be seen that the invention provides a device of this character which is not only simple in construction, but which may be readily and conveniently applied for use in connection with a dispensing faucet of common type, without modification or by slight modification thereof, so that a measured quantity of liquid may be dispensed and the amount dispensed on each dispensing action indicated, the amount dispensed from a container in use indicated, and the amount dispensed during any given time from a series of containers indicated, so as to enable the proprietor of an establishment dispensing liquids to keep tab on sales or dispensing actions and to avoid the losses due to carelessness in handling a dispensing apparatus from pure waste or other causes. While the construction disclosed is preferred, it will, of course, be understood that changes in the form, proportions and details of construction, falling within the scope of the appended claims, may be made without departing from the spirit or sacrificing any of the advantages of the invention.

What I claim is:—

1. In a beer or like liquid dispensing apparatus, a casing having a liquid inlet at its top, a liquid outlet at its bottom and a measuring chamber therebetween, a movable measuring device in said chamber, an indicator mechanism, the said liquid inlet having a comparatively wide entrance portion and a constricted discharge portion connecting trangentially with said chamber at one side and below the top thereof, and means including a pressure actuated blade or plate movable in the flaring portion of the chamber for throwing said indicator mechanism into and out of action.

2. In a beer or like liquid dispensing apparatus, a casing having a liquid inlet at its top, a liquid outlet at its bottom and a measuring chamber therebetween, a rotary measuring wheel in said chamber, an indicator mechanism, the said liquid inlet having a comparatively wide entrance portion, a constricted discharge portion connected tangentially with said chamber at one side and below the top thereof and an inclined seat surface located at one side of said inlet between said portions, a rock shaft journaled in the casing and controlling said indicator, and a blade carried by said shaft and disposed in the entrance portion of said liquid so as to normally occupy an obstructing position between the same and the constricted portion of the inlet, said blade being movable downwardly under liquid pressure to a non-obstructing position against said seat and operative in so doing to rock said shaft to permit operation of the indicator.

3. In a beer or like liquid dispensing apparatus, a casing having a liquid inlet at its top, a liquid outlet at its bottom and a measuring chamber therebetween, a rotary measuring wheel in said chamber, an indicator mechanism, the said liquid inlet having a comparatively wide entrance portion, a constricted discharge portion connected tangentially with said chamber at one side and below the top thereof and an inclined seat surface located at one side of said inlet between said portions, a rock shaft journaled in the casing and controlling said indicator, a blade carried by said shaft and disposed in the entrance portion of said liquid so as to normally occupy an obstructing position between the same and the constricted portion of the inlet, said blade being movable downwardly under liquid pressure to a non-obstructing position against said seat and operative in so doing to rock said shaft to permit operation of the indicator. and spring controlled means operating on said shaft to return the blade shaft and indicator to normal position upon the cessation of liquid pressure on the blade.

4. In a beer or like liquid dispensing apparatus having a valved dispensing faucet, the combination of a casing connected with the outlet of the faucet and having an inlet and an outlet, a rotary measuring wheel disposed in the casing between the inlet and the outlet, an indicator hand carried by the casing, gearing including a transmission shaft driven by the measuring wheel for actuating said indicator hand, a slidable and rotatable clutch sleeve movable into and out of clutch engagement with the transmission shaft, an indicator operating shaft extending through said sleeve and having a sliding gear connection therewith for operating the indicator hand when the sleeve is rotated, said sleeve being provided with a cam surface having high and low points and a recess therebetween, a spring acting on said clutch sleeve for moving the same in disengaging direction, and a motion transmitting member for moving the sleeve in engaging direction and permitting said sleeve to remain normally in disengaged position, said member comprising a crank shaft having a blade exposed to the pressure of fluid flowing to the casing when the faucet is open to rock said shaft in motion transmitting direction and having a crank arm engaging the sleeve for transmitting engaging motion thereto, said crank arm normally engaging the cam recess to hold the sleeve against rotation in normal direction and being engageable by said cam in the rotation of the sleeve and under its return movement by the spring to return said motion transmitting device to normal position upon a cessation of fluid pressure in the casing.

FREDERICK TRINCA.